(12) United States Patent
Masarwa et al.

(10) Patent No.: US 8,220,838 B2
(45) Date of Patent: Jul. 17, 2012

(54) IRRIGATION PIPE CONNECTOR

(75) Inventors: Abed Masarwa, Taybi (IL); James Wallace Belford, D.N. Hefer (IL)

(73) Assignee: Netafim, Ltd., Tel Aviv (IL)

( * ) Notice: Subject to any disclaimer, the term of this patent is extended or adjusted under 35 U.S.C. 154(b) by 328 days.

(21) Appl. No.: 12/357,504

(22) Filed: Jan. 22, 2009

(65) Prior Publication Data

US 2009/0211661 A1   Aug. 27, 2009

Related U.S. Application Data

(60) Provisional application No. 61/031,293, filed on Feb. 25, 2008.

(51) Int. Cl.
*F16L 41/00* (2006.01)

(52) U.S. Cl. ............ 285/141.1; 285/201; 285/200; 239/542

(58) Field of Classification Search .......... 285/201, 285/141.1, 288.1, 203, 208, 200, 202; 239/542
See application file for complete search history.

(56) References Cited

U.S. PATENT DOCUMENTS

| | | | |
|---|---|---|---|
| 1,143,351 A | 6/1915 | Benson | |
| 1,211,486 A * | 1/1917 | Pickop | 285/201 |
| 1,292,812 A * | 1/1919 | Lachman | 285/189 |
| 1,392,204 A * | 9/1921 | Nichols | 220/62.18 |
| 1,798,596 A * | 3/1931 | Fahrney | 285/189 |
| 1,896,216 A * | 2/1933 | Brandt | 285/288.1 |
| 2,080,326 A * | 5/1937 | Maddock | 220/592.19 |
| 2,084,200 A * | 6/1937 | Karlson | 285/201 |
| 2,107,802 A | 11/1937 | Roach | |
| 2,132,636 A | 10/1938 | Maahs | |
| 2,209,325 A * | 7/1940 | Dennis | 285/288.1 |
| 2,291,941 A * | 8/1942 | Bachini | 285/288.1 |
| 2,299,183 A * | 10/1942 | Shanor | 285/201 |
| 2,457,983 A | 1/1949 | De Swart | |
| 2,471,475 A * | 5/1949 | Andrus | 285/201 |
| 2,583,007 A * | 1/1952 | Nilson | 285/189 |
| 2,595,408 A | 5/1952 | Quest | |
| 2,776,169 A | 1/1957 | Aschenbrenner | |
| 2,788,232 A * | 4/1957 | Stadthaus | 285/201 |
| 3,490,791 A | 1/1970 | Mitchell | |
| 3,654,008 A * | 4/1972 | Rogers et al. | 285/133.11 |
| 3,677,578 A | 7/1972 | Roos | |

(Continued)

FOREIGN PATENT DOCUMENTS

AU    14194/66    5/1969

(Continued)

OTHER PUBLICATIONS

International Search Report in PCT/IL2008/000190, dated Jun. 4, 2009.

(Continued)

*Primary Examiner* — David E Bochna
(74) *Attorney, Agent, or Firm* — Womble Carlyle

(57) ABSTRACT

An irrigation pipe connector has a core that is adapted to connect to an irrigation element and a wing that is attachable to a wall of a pipe. The wing is provided with resiliency to allow the connector to deform in response to changing fluid pressures in the pipe. In addition, the wing may be provided with a thin segment in order to reduce potential damage during welding of the wing to the wall of the pipe.

21 Claims, 3 Drawing Sheets

U.S. PATENT DOCUMENTS

| | | | |
|---|---|---|---|
| 3,837,619 A | 9/1974 | Sherman | |
| 3,863,960 A | 2/1975 | Andersson | |
| 4,000,620 A | 1/1977 | Burge | |
| 4,132,364 A | 1/1979 | Harmony | |
| 4,544,030 A * | 10/1985 | Crook et al. | 285/189 |
| 4,593,857 A | 6/1986 | Raz | |
| 4,632,282 A * | 12/1986 | Nagashima | 222/529 |
| 4,654,942 A | 4/1987 | Rush et al. | |
| 4,708,374 A * | 11/1987 | Cox | 285/133.4 |
| 4,887,851 A | 12/1989 | Rush et al. | |
| 5,145,216 A | 9/1992 | Valls, Jr. | |
| 5,221,028 A * | 6/1993 | Dwinell | 285/201 |
| 5,326,139 A | 7/1994 | Corcoran | |
| 5,560,654 A | 10/1996 | Cobb, Jr. | |
| 5,897,823 A * | 4/1999 | Davis et al. | 264/266 |
| 5,967,376 A * | 10/1999 | McLelland et al. | 222/153.06 |
| 6,065,321 A | 5/2000 | Kosch et al. | |
| 6,089,615 A | 7/2000 | Jappinen | |
| 7,588,201 B2 * | 9/2009 | Masarwa et al. | 285/5 |
| 2002/0047053 A1 | 4/2002 | Bron | |
| 2003/0201345 A1 | 10/2003 | Jeong | |
| 2004/0050975 A1 | 3/2004 | Panourgias et al. | |
| 2005/0109414 A1 | 5/2005 | Jeong | |
| 2005/0194469 A1 | 9/2005 | Masarwa et al. | |
| 2006/0103132 A1 | 5/2006 | Hardin et al. | |
| 2007/0074776 A1 | 4/2007 | Masarwa et al. | |
| 2007/0277893 A1 | 12/2007 | Belford | |
| 2008/0303273 A1 | 12/2008 | Masarwa | |

FOREIGN PATENT DOCUMENTS

| | | |
|---|---|---|
| DE | 1964860 | 7/1970 |
| EP | 0284570 | 9/1988 |
| FR | 2027029 | 9/1970 |
| FR | 2551834 | 3/1985 |
| GB | 1269499 | 4/1972 |
| GB | 2187622 | 9/1987 |
| JP | 8318177 | 12/1996 |
| RU | 2134036 | 8/1999 |
| WO | WO 02/066881 | 8/2002 |
| WO | WO 2005/084418 | 9/2005 |

OTHER PUBLICATIONS

Written Opinion in PCT/IL2008/000190, dated Jun. 4, 2009.

* cited by examiner

IRRIGATION PIPE CONNECTOR

The present application claims priority to U.S. Provisional Application No. 61/031,293, filed Feb. 25, 2008, whose contents are incorporated in their entirety.

BACKGROUND

The present disclosure relates to a connector for use in an irrigation system.

Such a connector may be used in a main distribution pipe to enable for example drip irrigation pipes to branch off therefrom.

US Patent Application No. 20050194469, the disclosure of which is incorporated herein by reference, describes an irrigation pipe with pipe connectors.

US Patent Application No. 20070074776, the disclosure of which is incorporated herein by reference, describes that the walls of a pipe under internal hydrostatic pressure experience stress.

SUMMARY

The following embodiment and aspects thereof are described and illustrated in conjunction with systems, tools and methods which are meant to be exemplary and illustrative, not limiting in scope.

In one aspect, the present invention is directed to a irrigation pipe connector. In one embodiment, the irrigation pipe connector includes: (a) a core having an upper portion, a lower portion and an opening extending between the upper and lower portions, the core being adapted to connect to an irrigation element, and (b) a wing connected to the core and extending radially outwardly therefrom, the wing comprising a leg and a flange, the flange being adapted to attach to a wall of an irrigation pipe, the leg being attached at a first end thereof to the flange and at a second end thereof to the core; wherein at least a portion of the connector is adapted to resiliently bend to thereby allow displacement of the flange relative to the core.

The core and the wing may be integrally formed of the same material and have unitary one-piece construction.

The opening may comprise a bore and the connector is adapted to connect to the irrigation element at the bore. Furthermore, the bore may be threaded.

A groove may be formed in the connector between the core and the leg. Furthermore, a depth of the groove may be at least as great as a thickness of the leg. In addition, the leg may extends upwardly and radially outwardly, from the core's lower portion towards the flange.

The core has an axis (C), and the flange may comprise a radially inward segment and a peripheral segment that extends radially outwardly from the radially inward segment; wherein a thickness of the peripheral segment is smaller than a thickness of the radially inward segment, the thicknesses of the segments being taken in a direction along the axis (C).

In another embodiment, the irrigation pipe connector includes: (a) a core having an axis (C) and being adapted to connect to an irrigation element; and (b) a wing connected to the core and extending radially outwardly therefrom relative to the axis (C), the wing comprising a radially inward segment and a peripheral segment that extends radially outwardly from the radially inward segment; wherein a thickness of the peripheral segment is smaller than a thickness of the radially inward segment, the thicknesses of the segments being taken in a direction along the axis (C).

In still another embodiment, the irrigation pipe connector includes: (a) a core adapted to connect to an irrigation element; and (b) a wing comprising a leg and a flange, the wing extending about the core and connected to the core via the leg, the wing being attachable to a pipe; wherein the flange comprises a main segment and a peripheral segment and the peripheral segment has a thickness that is smaller than a thickness of the main segment.

In another aspect, the present invention is directed to an irrigation pipe having a lumen including a pipe wall; and at least one irrigation pipe connector. The irrigation pipe connector includes: (a) a core adapted to connect to an irrigation element; and (b) a wing extending about the core and comprising a segment connected to the pipe wall; wherein at least a portion of the wing is adapted to resiliently bend to thereby allow displacement of the segment connected to the pipe wall relative to the core.

In addition to the exemplary aspects and embodiment described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The disclosure, however, both as to organization and method of operation, together with objects, features, and advantages thereof, may best be understood by reference to the following detailed description when read with the accompanying figures, in which.

Figure 1:
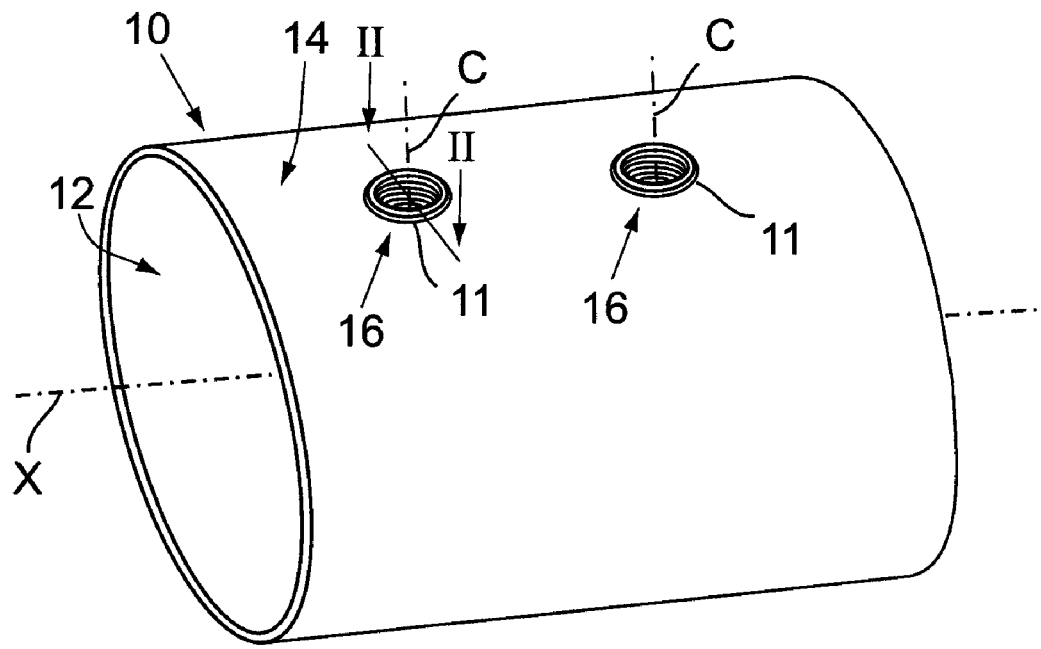
FIG. 1 shows a perspective view of a pipe incorporating connectors in accordance with the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1. A pipe 10 having a longitudinal axis X has an axially extending lumen 12 that is surrounded by a wall 14. Two connectors 16, each having its own axis C, are attached at longitudinally spaced apart locations to the wall 14 of the pipe 10 adjacent apertures 11 that are formed through the wall 14. The pipe 10 is of a lay-flat type which when not in use under internal fluid pressure and/or when rolled on a reel may have a shape of a generally flat strip (not shown). When the pipe 10 is under no internal fluid pressure, the connector axis C may be coincident with a normal N to the pipe 10.

An outward and an inward direction of the axis C is defined respectively out of and into the pipe 10. It should be noted that the directional terms appearing throughout the specification and claims are for illustrative purposes only, and are not intended to limit the scope of the appended claims. The terms "up", "above", "upper", "out" (and derivatives thereof) define similar directions; and the terms "down", "below", "lower", "in" (and derivatives thereof) define similar directions.

Figure 2:
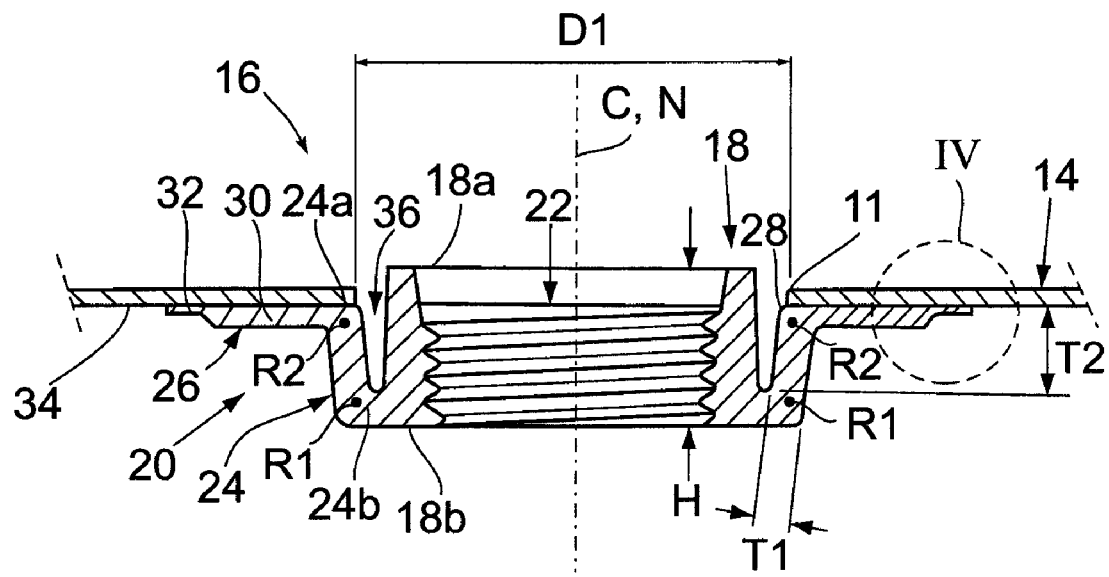
FIG. 2 shows a partial cross sectional view of the pipe taken through one of the connectors in the plane II-II in FIG. 1.
Figure 3:
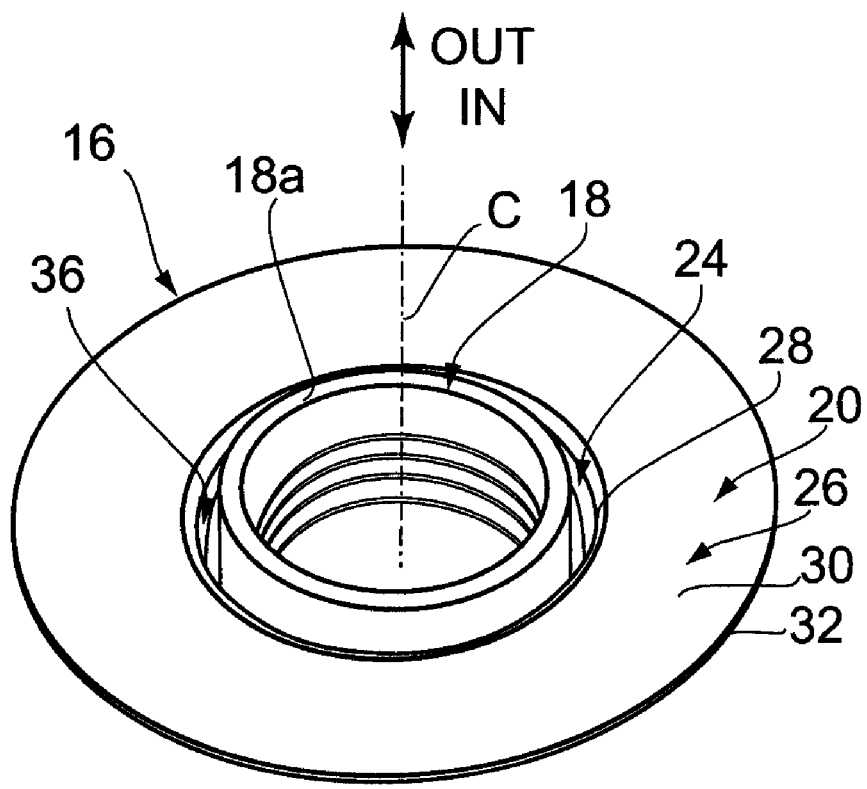
FIG. 3 shows a perspective top view of the connector.

Attention is drawn to FIGS. 2 and 3. The connector 16 has a central core 18 that extends a thickness or height H along axis C and a peripheral wing 20 that is located thereabout. In one embodiment, the central core 18 and the peripheral wing 20 are integrally formed of the same material and have unitary one-piece construction.

The central core 18 has an upper portion 18a which is exposed to the outer surface of the pipe 10 and an lower portion 18b which is exposed to the inner surface of the pipe 10. In one embodiment, the wing 20 extends radially outwardly relative to the core 18. The core 18 is adapted to retain an irrigation element 40 (See FIGS. 5A, 5B) and is provided with an opening 22 that is formed therein along axis C and extends between the upper portion 18a and the lower portion 18b. In one embodiment, the opening 22 is in the form of a through going bore 22. The bore 22 is optionally adapted to connect to the irrigation element which may be for example a drip irrigation pipe, an irrigation fitting, a sprinkler, a valve, a pressure regulator, etc. Optionally, the bore 22 is threaded though other means may be formed in the bore 22 in order to retain an irrigation element. Preferably the core 18 is adapted to releasably retain irrigation elements.

The wing 20 has a leg 24 and a flange 26 which are joined at a rim 28. As seen in FIG. 2, the leg 24 is attached at its first end 24a towards the flange 26 and at its second end 24b to the core 26. At its second end 24b, the leg 24 extends outwardly from an inner circumference of the core 18, proximate the core's lower portion 18b, to the rim 28. Thus, in one embodiment, the leg 24 extends from the core's lower portion 18b, upwardly along axis C and radially outwardly away from axis C, to the flange 26. As also seen in FIG. 2, the thickness of the leg 24 is given by T1.

The flange 26 has a radially inward main segment 30 and a radially outward peripheral segment 32. The main segment 30 extends in a radially outward direction relative to the core 18, generally perpendicular to axis C and in a direction away from axis C from the rim 28 to the peripheral segment 32. The peripheral segment 32 extends from the main segment 30 in a radially outward direction relative to the core 18. The connector 16 is attached at the flange 26 optionally to an inner surface 34 of the wall 14 adjacent aperture 11 and optionally the attachment is performed by, for example, bonding or welding, etc.

A peripheral groove 36 is formed in the connector 16 between the leg 24 and the core 18. As seen in FIG. 2, the depth of the groove 36, which depth is taken from the uppermost level of the main segment 30 and the peripheral segment 32, is given by T2. In one embodiment, the groove depth T2 is at least 1.0 times T1, and more preferably 2.0 times T1. This optionally provides a first resilient region R1 in the connector 16 about the axis C, between the leg 24 and the core 18 at the core's lower portion 18b. Optionally, a second resilient region R2 may be formed in the connector 16 adjacent the rim 28 where the flange 26 and leg 24 merge. It is noted that the term resilience implies that the resulting structure is afforded locations with resilient bending. The degree of resilient bending is a question of optimal design and it may be that embodiments of the connector 16 may have only one location or more than two locations that are afforded resilient bending.

In cross sections including axis C, the aperture 11 in the pipe's wall 14 has a dimension D1 that is the diameter of the aperture 11 when the pipe 10 is in a lay-flat state wherein the aperture 11 may have a circular form. It is noted that when subjected to internal fluid pressure, the aperture 11 may assume an elliptical shape when viewed along the axis C (view not shown) with the larger dimension of the ellipse being oriented along the pipe's circumferential direction. This is due to the fact that pipes under internal hydrostatic pressure typically experience larger stress in the circumferential direction as opposed to the longitudinal direction.

Figure 5A:
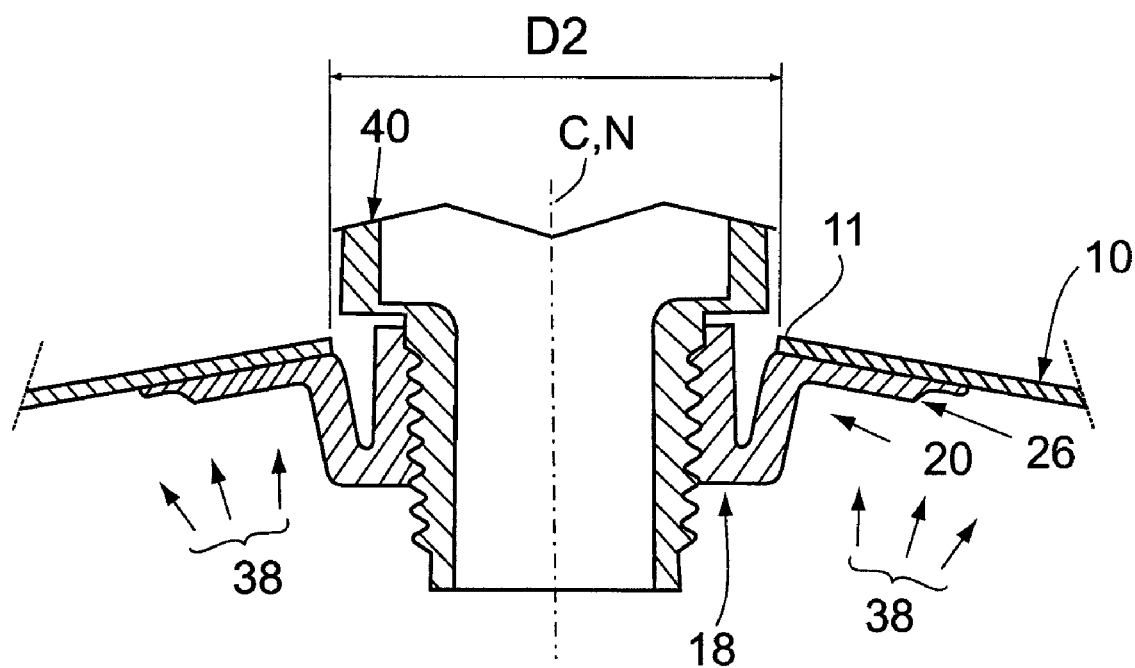
FIGS. 5A and 5B show the arrangement of FIG. 2 with the connector coupled to an irrigation element and subjected to various resilient bending.
Figure 5B:
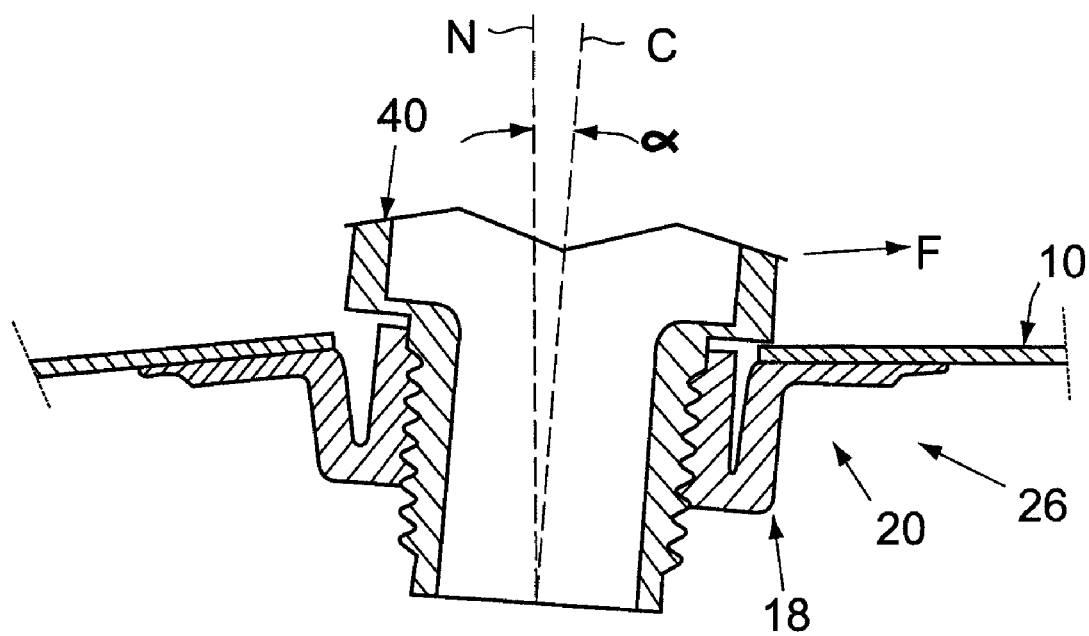

Attention is drawn to FIGS. 5A and 5B showing a partial view of an irrigation element in the form of a fitting 40 that is retained in the connector's opening 22. As seen in the cross-section of FIG. 5A, under internal fluid pressure illustrated by short arrows 38, the pipe 10 expands outwardly and thereby the aperture 11 reaches an enlarged state. At least a portion of the wing 20 is adapted to resiliently bend to thereby allow displacement relative to the core 18 of the wing's flange 26 that is attached to the pipe's wall 14. In a cross section including axis C, the aperture 11 in the pipe's wall 14 has in the enlarged state a dimension D2 that is larger than a respective dimension D1 of the aperture 11 in the lay-flat state. In one embodiment, in the pipe's circumferential direction D2 may be 25% larger than D1 and in the pipe's longitudinal direction D2 may be 15% larger than D1 and therefore in this embodiment the resiliency of the connector is adapted to allow such varying displacements of the flange 26 in relation to the core 18.

As seen in the cross-section of 5B, the irrigation element attached to the connector may be subjected in some cases to a force F acting in a direction transverse to axis C. Force F may be due to a lateral pipe (not shown) attached to the irrigation element that exhibits deformation due to high and low temperatures imposed thereupon during day and night. The core 18 and the wing 20 are arranged such that at least a portion of the wing 20 is adapted to resiliently bend to thereby allow displacement of the wing's flange 26 relative to the core 18. When the connector 16 is installed in a pipe 10, the connector's core 18 may bend relative to the pipe 10 such that the connector axis C may be tilted by an angle α relative to a normal N to the pipe 10. In one embodiment, α may reach an angle of 10° when, for example, the connector is subjected to a force F of a magnitude of about 850 N.

Under internal fluid pressure, the pipe 10 may experience stresses which may cause deformations in the wall 14 of the pipe 10 that may be transformed to the connector 16 that is attached thereto. These deformations may ruin or harm, inter alia, the retention of the irrigation element in the core 18. In the connector 16 in accordance with the present disclosure, such deformations resiliently deform the wing 20 and thereby displace the flange 26 in relation to the core 18. As a result, the extent of damage that may have been imposed upon the connector 16 is eliminated or decreased.

By way of an example, the material of the pipe 10 may be polyethylene, the diameter of the pipe 10 may be about 100 millimeters, the pipe 10 may withstand fluid pressure of up to 3 bars and the wing 20 may start to resiliently deform at an internal fluid pressure in the pipe 10 of about 0.3 bars.

Figure 4:
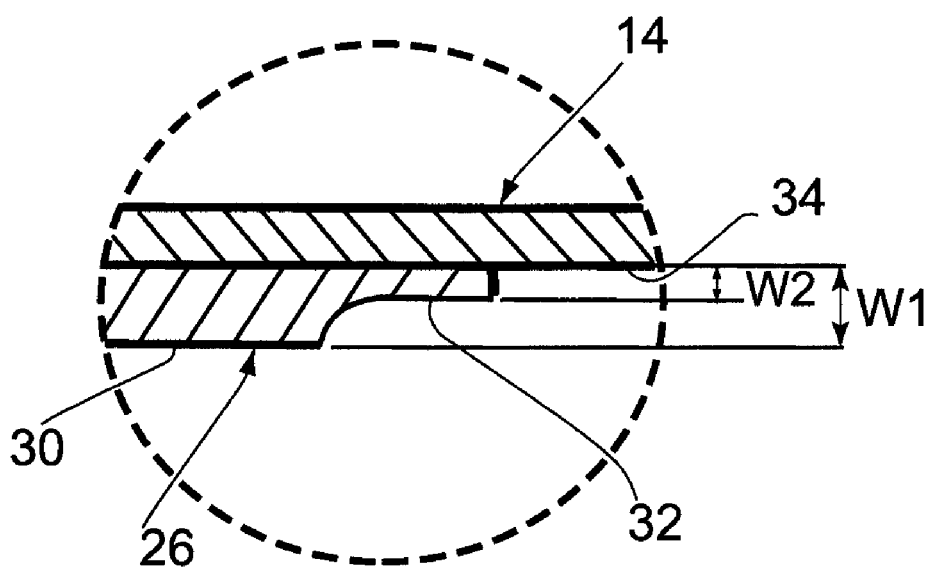
FIG. 4 shows a section of FIG. 2.

Attention is now drawn to FIGS. 2 and 4. In an embodiment, the connector 16 is attached to the wall 14 of the pipe 10 by welding it to the wall 14 of the pipe 10 by at least portions of the connector 16 and/or wall 14 that at an instant immediately prior to attachment were in a melted form. Preferably, the connector 16 is attached to the wall 14 of the pipe 10 by ultrasonic welding and/or knurling and preferably the connector is made of a material that is similar to material that is included in the wall of the pipe. The pipe may be produced as a high or a low pressure resistant hose made of polymer materials strengthened by a bonded layer or layers such as textile, knitted woven or non-woven fabric, bi-oriented polymer, high stiffness polymer, etc. Polymer materials such as PE, PP, PVC, TPE, elastomers and others may be used.

In a part that is adapted to be attached to a surface by such welding, the width of the part determines, inter alia, the amount of energy that is required for attachment. In a lay flat irrigation pipe 10, portions of the wall 14 of the pipe 10 that are not attached to, or concealed by, the connector 16 may be damaged or harmed by this energy that is required for attachment. For example, a portion of the wall 14 adjacent the peripheral segment 32 of the flange 26 may be damaged when the flange 26 is attached to the wall 14. The wall 14 of the lay flat irrigation pipe may be coated for example by a water impervious layer and during attachment damage may be caused to the layer by for example pin holes that are formed in the layer through which fluid may seep.

As seen in FIGS. 2 and 4, the main segment 30 of the flange 26 has a first thickness W1 and the peripheral segment 32 of the flange 26 has a second thickness W2, the thicknesses W1 and W2 being taken in a direction along the axis C. The second thickness W2 is smaller than the first thickness W1 and both thicknesses W2, W1 are substantially smaller than the thickness H of the core 18 and/or a height of the core 18 that projects into the pipe 10.

As a result of W2 being smaller than W1, the energy that is required for the attachment of the peripheral segment 32 of the flange 26 to the wall 14 of the pipe 10 is reduced in relation to the energy that is required for the attachment of the main segment 30 to the wall 14. Therefore, the wall 14 adjacent the peripheral segment 32 is less likely to be damaged or may be damaged to a smaller extent during attachment.

By way of an example, the first thickness W1 is equal to about 2 millimeters and the second thickness W2 is equal to about 0.6 millimeters.

The thinner thickness W2 of the peripheral segment 32 provides also the advantage that the connector 16 is provided with a flexible periphery at the flange 26. This enables the pipe 10, for example when under internal fluid pressure, to better assume a rounded form adjacent the connector 16. It is noted that this advantage is present when the connector 16 is attached to the wall of the pipe also by methods such as by bonding, welding, etc.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Although the present embodiment has been described to a certain degree of particularity, it should be understood that various alterations and modifications could be made without departing from the scope of the disclosure as hereinafter claimed.

What is claimed is:

1. An irrigation pipe connector comprising:
   a core having an upper portion, a lower portion and an opening extending between the upper and lower portions, the core being adapted to connect to an irrigation element; and
   a wing connected to the core and extending radially outwardly therefrom, the wing comprising a leg and a flange, the flange being adapted to attach to a wall of an irrigation pipe, the leg being attached at a first end thereof to the flange and at a second end thereof to the core; wherein:
   at least a portion of the connector is adapted to resiliently bend to thereby allow displacement of the flange relative to the core;
   the core has an axis (C);
   the flange comprises a radially inward segment and a peripheral segment that extends radially outwardly from the radially inward segment; and
   a thickness of the peripheral segment is smaller than a thickness of the radially inward segment, the thicknesses of the segments being taken in a direction along the axis (C).

2. The irrigation pipe connector according to claim 1, wherein the core and the wing are integrally formed of the same material and have unitary one-piece construction.

3. The irrigation pipe connector according to claim 1, wherein the opening comprises a threaded bore and the connector is adapted to connect to the irrigation element at the threaded bore.

4. The irrigation pipe connector according to claim 1, wherein a groove is formed in the connector between the core and the leg.

5. The irrigation pipe connector according to claim 4, wherein a depth of the groove is at least as great as a thickness of the leg.

6. The irrigation pipe connector according to claim 4, wherein the leg extends upwardly and radially outwardly, from the core's lower portion towards the flange.

7. The irrigation pipe connector according to claim 4, wherein the groove is open toward the upper portion, the irrigation pipe connector adapted to removably receive the irrigation element adjacent to the upper portion.

8. The irrigation pipe connector according to claim 1, wherein:
   the leg connects to the core at a first resilient region; and
   the leg connects to the flange at a second resilient region.

9. The irrigation pipe connector according to claim 1, wherein:
   at least a portion of the connector comprises a polymer material; and
   the polymer material comprises polyethylene ("PE"), polypropylene ("PP"), polyvinyl chloride ("PVC"), or thermoplastic elastomer ("TPE").

10. The irrigation pipe connector according to claim 1, wherein:
    at least a portion of the connector comprises a polymer material; and
    the polymer material comprises an elastomer.

11. An irrigation pipe connector comprising:
    a core having an axis (C) and being adapted to connect to an irrigation element; and
    a wing connected to the core and extending radially outwardly therefrom relative to the axis (C), the wing comprising a flange having a radially inward segment and a peripheral segment that extends radially outwardly from the radially inward segment; wherein:
    a thickness of the peripheral segment is smaller than a thickness of the radially inward segment, the thicknesses of the segments being taken in a direction along the axis (C); and
    at least a portion of the connector is adapted to resiliently bend to thereby allow displacement of the flange relative to the core.

12. The irrigation pipe connector according to claim 11, wherein the core and the wing are integrally formed of the same material and have unitary one-piece construction.

13. The irrigation pipe connector according to claim 11, wherein:
    the core has a threaded through going bore.

14. A lay-flat irrigation pipe comprising:
a lumen including a pipe wall, wherein the lay-flat irrigation pipe when rolled onto a reel has a shape of a generally flat strip; and
at least one irrigation pipe connector, said irrigation pipe connector comprising:
a core adapted to connect to an irrigation element; and
a wing extending about the core and comprising a segment connected to the pipe wall;
wherein:
at least a portion of the wing is adapted to resiliently bend to thereby allow displacement of the segment connected to the pipe wall, relative to the core.

15. The irrigation pipe according to claim 14, wherein:
the core and the wing are integrally formed of the same material and have unitary one-piece construction.

16. The irrigation pipe according to claim 14, wherein:
a groove is formed in the connector between the segment connected to the pipe wall and the core to thereby facilitate the displacement of the segment relative to the core.

17. An irrigation pipe connector comprising:
a core having an upper portion, a lower portion, and a threaded bore extending through the upper and lower portions, the threaded bore being devoid of threads at the upper portion, the core being adapted to removably connect to an irrigation element via the threaded bore upon insertion via the core's upper portion;
a wing connected to the core and extending radially outwardly therefrom, the wing comprising a leg and a flange, the flange being adapted to attach to a wall of an irrigation pipe, the leg being attached at a first end thereof to the flange and at a second end thereof to the core; and
a groove, open toward the upper portion, formed in the connector between the core and the leg;
wherein:
the irrigation pipe connector is adapted to resiliently bend via at least the groove to thereby allow displacement of the flange relative to the core.

18. The irrigation pipe connector according to claim 17, wherein the core and the wing are integrally formed of the same material and have unitary one-piece construction.

19. The irrigation pipe connector according to claim 17, wherein a depth of the groove is at least as great as a thickness of the leg.

20. The irrigation pipe connector according to claim 17, wherein the leg extends upwardly and radially outwardly, from the core's lower portion towards the flange.

21. The irrigation pipe connector according to claim 17, wherein:
the leg connects to the core at a first resilient region; and
the leg connects to the flange at a second resilient region.

* * * * *